United States Patent
Dolgas et al.

[11] Patent Number: 6,098,974
[45] Date of Patent: Aug. 8, 2000

[54] ARMATURE SUPPORT PALLET

[75] Inventors: Patrick A. Dolgas, Milford; E. Wayne Zicht, Huber Heights; Alvin C. Banner, Kettering, all of Ohio

[73] Assignee: Globe Products Inc., Huber Heights, Ohio

[21] Appl. No.: 08/430,580

[22] Filed: Apr. 28, 1995

Related U.S. Application Data

[63] Continuation of application No. 08/234,134, Apr. 28, 1994, abandoned.

[51] Int. Cl.[7] .................................................. B23Q 3/00
[52] U.S. Cl. ........................................ 269/296; 29/281.5
[58] Field of Search .................................. 269/296–302, 269/47, 315, 903; 29/281.4, 732, 735, 736, 759, 760, 559; 414/781

[56] References Cited

U.S. PATENT DOCUMENTS

| | | | |
|---|---|---|---|
| 2,885,165 | 5/1959 | Smolen | 269/296 |
| 3,118,662 | 1/1964 | Fassett et al. | 269/296 |
| 4,206,911 | 6/1980 | Harrison | 269/296 |
| 4,560,151 | 12/1985 | Grundy | 269/296 |
| 4,676,490 | 6/1987 | Hopkins | 269/296 |
| 4,843,702 | 7/1989 | Charest | 269/296 |
| 4,911,606 | 3/1990 | Eckart et al. | 269/296 |
| 4,982,827 | 1/1991 | Seitz et al. | |
| 5,061,008 | 10/1991 | Saunders | 269/38 |
| 5,115,901 | 5/1992 | Santandrea et al. | |
| 5,253,912 | 10/1993 | Andorlini et al. | 294/119.1 |
| 5,257,689 | 11/1993 | Lombardi et al. | 198/468.2 |
| 5,348,142 | 9/1994 | Nishimura et al. | |

FOREIGN PATENT DOCUMENTS

| | | |
|---|---|---|
| 920156392 | 1/1994 | Japan . |
| WO/96/07231A1 | 3/1996 | WIPO . |

OTHER PUBLICATIONS

Globe Products Inc. drawing M95765–4, dated Mar. 1, 1993, titled Pallet Tooling Assembly.

*Primary Examiner*—Robert C. Watson
*Attorney, Agent, or Firm*—Roger S. Dybvig

[57] ABSTRACT

Armature support pallets are provided with support assemblies which have parts that cooperate with structural features of the armature assembly they carry to maintain the rotary orientation there

12 Claims, 1 Drawing Sheet

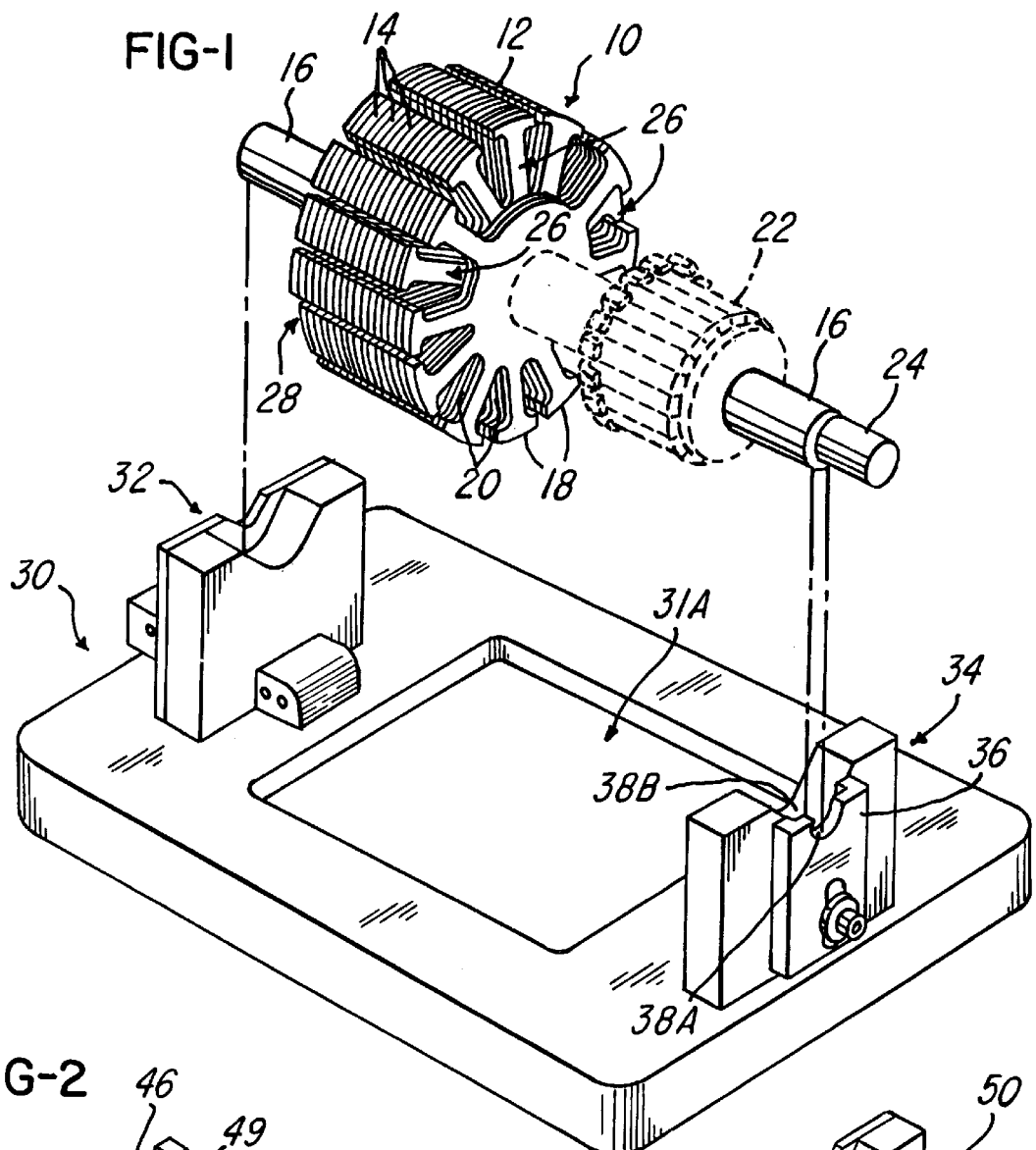
FIG-1
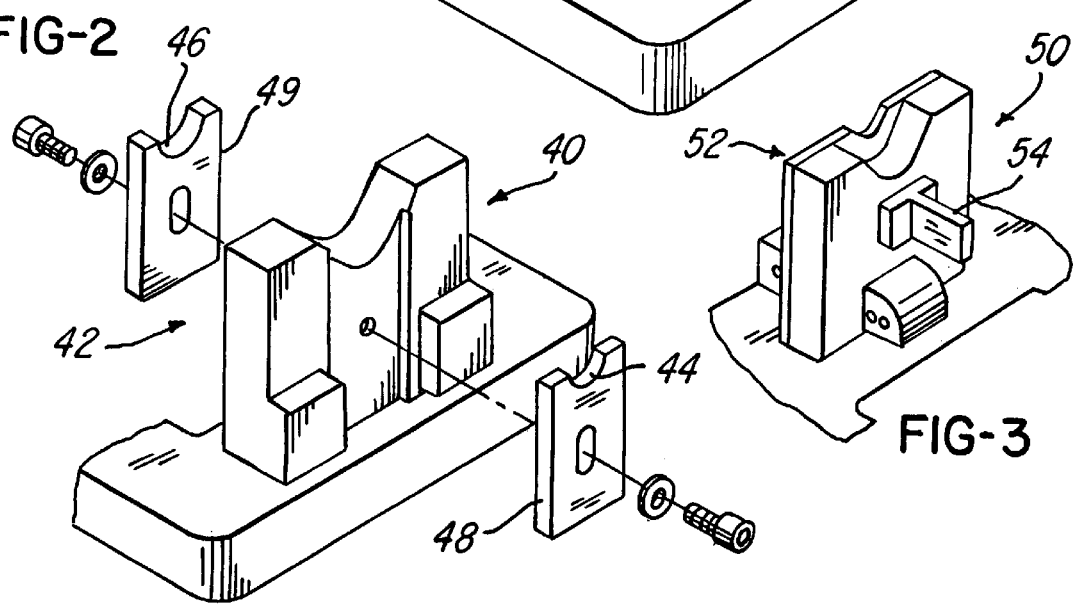
FIG-2
FIG-3

ARMATURE SUPPORT PALLET

This is a continuation of application(s) Ser. No. 08/234,134 filed on Apr. 28, 1994 now abandoned.

FIELD OF THE INVENTION

This invention relates to an armature support pallet used for conveying parts of electric motor armatures while they are being manufactured.

BACKGROUND OF THE INVENTION

During manufacture of an electric motor armature, partially manufactured assemblies are often conveyed by a conveyor from one manufacturing station to the next. Ordinarily, because the basic armature construction uses generally symmetrical parts, such as round armature shafts, cylindrical cores, and cylindrical commutators, there is no need to orient the partially manufactured armatures on the pallets that carry them. However, there are occasions in which it would be useful to control the rotational orientation of armature shafts relative to pallets so that their rotational orientation may be maintained as the parts move from one manufacturing machine to the next.

SUMMARY OF THE INVENTION

An object of this invention is to provide improved pallets by which the parts of armatures being manufactured may be maintained in uniform rotational alignment.

In accordance with this invention, pallets are provided with armature support assemblies which have parts that cooperate with structural features of the armature assembly they carry to maintain the rotary orientation thereof.

Other objects and advantages will become apparent from the following description and the drawings.

BRIEF DESCRIPTION OF THE DRAWINGS

FIG. 1 is a simplified, exploded perspective view of an armature assembly and a pallet in accordance with this invention that supports the armature assembly.

FIG. 2 is a fragmentary exploded perspective view of a portion of a second embodiment of a pallet in accordance with this invention.

FIG. 3 is a fragmentary exploded perspective view of a portion of a third embodiment of a pallet in accordance with this invention.

DETAILED DESCRIPTION

FIG. 1 illustrates a partially manufactured electric motor armature, generally designated 10, having a core 12 made from a stack of slotted laminations 14 made from iron or other metal mounted on an armature shaft 16. Each of the laminations has plural teeth 18 separated by coil-receiving slots 20. At later stages of manufacture, so-called "end fibers" or end laminations (not shown) made from an insulating plastic material and a commutator shown by phantom lines 22, are also pressed on the shaft 16. The particular shaft 16 has a cam body 24 extending from its end adjacent the commutator 22. The cam body 24 is offset from the axis of rotation of the armature shaft 16, which axis is coincident with the center axis of the core 12. In operation of the completed armature (not shown), the offset location of the cam body 24 creates a balance problem. This problem can be partly alleviated by forming one or more of the metal laminations 14 nearest the commutator to asymmetrical shapes such that radially outermost parts of several of the teeth 18 thereof are removed or missing. The incomplete laminations are generally diametrically opposite the cam body 20, thus leaving gaps 26 in the end laminations. There may also be one of more laminations of the opposite end of the core 12 which are incomplete, as shown by the gap 28.

During manufacture of the armature assembly 10, it is necessary to obtain and maintain a particular angular orientation of the shaft 16 relative to the core 12. With reference to FIG. 1, a pallet 30 in accordance with this invention includes a body member 31 in the form of a rectangular plate having a central aperture 31A. As well known to those familiar with the art, the aperture 31A provides access from beneath the pallet to an armature loaded on the pallet. Mutually spaced support assemblies 32 and 34 for supporting the opposite ends of the armature shaft 16 are mounted on the body member 31 adjacent respective opposite margins of the central aperture 31A. The right side support assembly 34 has an auxiliary support piece 36 provided with two U-shaped support surfaces, namely, a smaller radius support surface 38A for engagement with the cam body 24 and a larger radius support surface 38B for engagement with the portion of the armature shaft 16 immediately adjacent the cam body 24. By loading the armature 10 into the pallet 30 so that its cam body is supported by the smaller radius support surface 38A, the armature 10 is held by gravity in a single angular orientation.

In the embodiment of FIG. 2, a pallet 40 is provided with a support assembly 42 having a smaller radius support surface 44 and a larger radius support surface 46 provided on respectively different auxiliary support plates 48 and 49.

In the embodiment of FIG. 3, which is useful also for armatures which have conventional round shafts without cam bodies or the like, one of the support assemblies 52 of a pallet 50 is provided with a blade 54 extending therefrom toward the other of the support assemblies (not shown). The blade 54 is sufficiently thin and so located that it is received within the radially outermost margin of one of the armature core slots to maintain the rotary orientation of an armature.

Although the presently preferred embodiments of this invention have been described, it will be understood that within the purview of the invention various changes may be made within the scope of the following claims.

Having thus described our invention, we claim:

1. An armature support pallet for use during manufacture of an armature having a shaft and a cam body extending from one end of the shaft about an axis parallel to and spaced from the axis of rotation of said shaft, said support pallet comprising:

a body member; and a pair of mutually spaced support assemblies mounted on said body member for supporting opposite ends of an armature shaft, one of said support assemblies having a first, generally circular support surface for supporting said cam body and a second, generally circular support surface for supporting a portion of said shaft adjacent said cam body, said first support surface having a smaller radius than said second support surface and being at an elevation higher than said second support surface so that, when the armature is loaded onto the pallet, said cam body is supported by the first, smaller radius support surface and the armature is held by gravity in a single angular orientation.

2. An armature support pallet for use during manufacture of an armature having a shaft and a slotted core mounted on said shaft, said pallet comprising:

a body member; and a pair of mutually spaced support assemblies mounted on said body member for supporting opposite ends of an armature shaft, one of said support assemblies having a blade extending therefrom toward the other of said support assemblies, said blade being sufficiently thin and so located that it is received within the radially outermost margin of one of the armature core slots of an armature loaded onto said pallet so that the rotary orientation of said armature shaft is maintained while the armature is supported by said support assemblies.

3. The armature support pallet of claim 1 wherein said one of said support assemblies has a single support piece with both of said support surfaces formed thereon.

4. The armature support pallet of claim 1 wherein said one of said support assemblies has a pair of support pieces, one of said support surfaces being formed on one of said support pieces and the other of said support surfaces being formed on the other of said support pieces.

5. An armature support pallet for use during manufacture of an armature having a shaft and a cam body extending from one end of the shaft about an axis parallel to and spaced from the axis of rotation of said shaft, said support pallet comprising:

a body member; and a pair of mutually spaced support assemblies mounted on said body member for supporting opposite ends of an armature shaft, one of said support assemblies having a first, generally circular support surface for supporting said cam body and a second, generally circular support surface for supporting a portion of said shaft adjacent said cam body, said first support surface having a smaller radius than said second support surface and being at an elevation higher than said second support surface so that, when the armature is loaded onto the pallet, said cam body is supported by the first, smaller radius support surface and the armature is held by gravity in a single angular orientation;

wherein said body member has an aperture formed therein, and wherein said support assemblies are mounted on said body member adjacent respective opposite margins of said aperture.

6. An armature support pallet for use during manufacture of an armature having a shaft and a slotted core mounted on said shaft, said pallet comprising:

a body member; and a pair of mutually spaced support assemblies mounted on said body member for supporting opposite ends of an armature shaft, one of said support assemblies having a blade extending therefrom toward the other of said support assemblies, said blade being sufficiently thin and so located that it is received within the radially outermost margin of one of the armature core slots of an armature loaded onto said pallet so that the rotary orientation of said armature shaft is maintained while the armature is supported by said support assemblies:

wherein said body member has an aperture formed therein, and wherein said support assemblies are mounted on said body member adjacent respective opposite margins of said aperture.

7. The armature support pallet of claim 5 wherein said one of said support assemblies has a single support piece with both of said support surfaces formed thereon.

8. The armature support pallet of claim 5 wherein said one of said support assemblies has a pair of support pieces, one of said support surfaces being formed on one of said support pieces and the other of said support surfaces being formed on the other of said support surfaces.

9. An armature support pallet for use during manufacture of an armature, said support pallet comprising:

a body member; and a pair of mutually spaced support assemblies mounted on said body member for supporting opposite ends of an armature shaft, one of said support assemblies having means for maintaining said armature in a single angular orientation.

10. An armature support pallet for use during manufacture of an armature, said support pallet comprising:

a body member; and a pair of mutually spaced support assemblies mounted on said body member for supporting opposite ends of an armature shaft, one of said support assemblies having means for maintaining said armature in a single angular orientation;

wherein said armature has a shaft and a cam body extending from one end of the shaft about an axis parallel to and spaced from the axis of rotation of said shaft, and wherein said means for maintaining said armature in a single angular orientation comprises a means for supporting a portion of said shaft adjacent said cam body at a first elevation and a means for supporting said cam body at a second elevation higher than said first elevation, so that the armature loaded onto said pallet is held by gravity in a single angular orientation.

11. The armature support pallet of claim 10 wherein each of said support means comprises a support surface.

12. The armature support pallet of claim 9 wherein said armature includes a shaft and a slotted core mounted on said shaft, and wherein one of said support assemblies has a blade extending therefrom toward the other of said support assemblies, said blade being sufficiently thin and so located that it is received within the radially outermost margin of one of the armature core slots of an armature loaded onto said pallet so that the rotary orientation of said armature shaft is maintained while the armature is supported by said support assemblies.

* * * * *